R. HORNSBY.
Reaping Machine.
No. 55,440.
2 Sheets—Sheet 1.
Patented June 5, 1866.
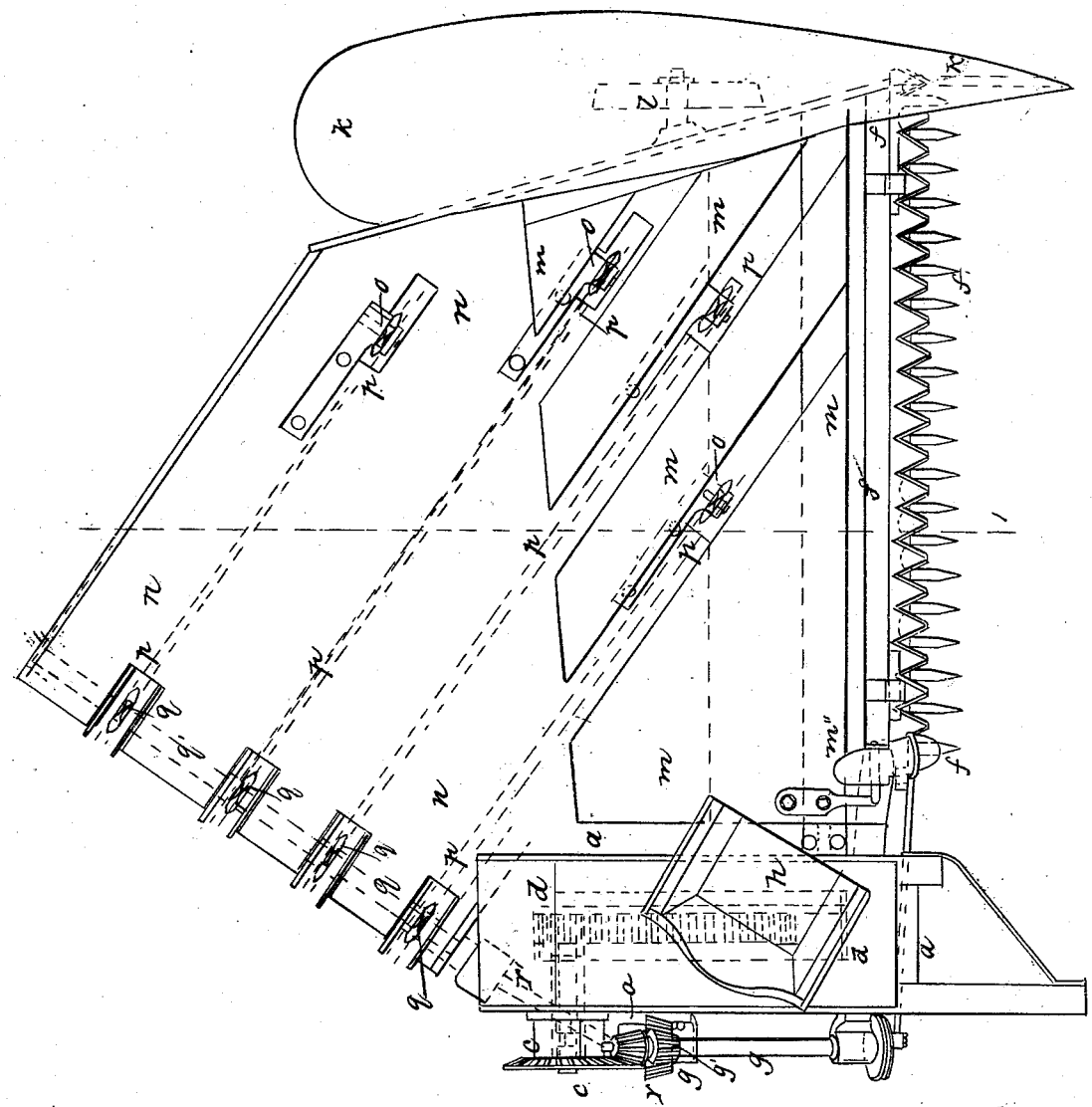
WITNESSES
INVENTOR

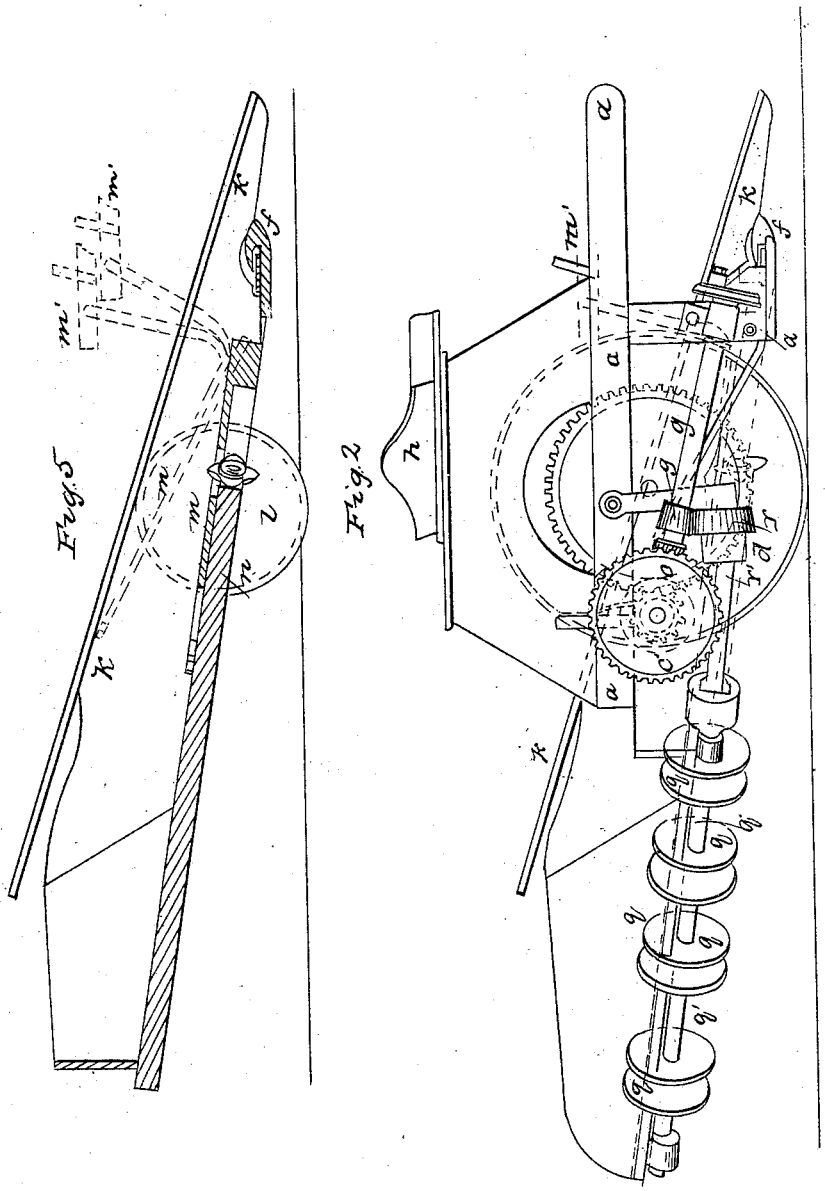

UNITED STATES PATENT OFFICE.

RICHARD HORNSBY, OF SPITTLEGATE, ENGLAND.

IMPROVEMENT IN REAPING-MACHINES.

Specification forming part of Letters Patent No. 55,440, dated June 5, 1866.

*To all whom it may concern:*

Be it known that I, RICHARD HORNSBY, of Spittlegate Iron Works, Grantham, in the county of Lincoln, England, a subject of the Queen of Great Britain, have invented or discovered new and useful Improvements in Reaping and Mowing Machines; and I, the said RICHARD HORNSBY, do hereby declare the nature of the said invention and in what manner the same is to be performed to be particularly described and ascertained in and by the following statement thereof—that is to say:

This invention has for its object improvements in reaping and mowing machines. In reaping-machines the crop, after it has been cut by the knife, has in some cases been made to fall onto an endless apron or onto bands or chains, which in traveling discharge it either at the side or at the back of the platform. When the discharge is at the back it leaves the track for the machine at its next passage incumbered, while if it be at the side it obliges the placing of the main carrying and driving wheel in front of the finger-bar, and this, for reasons which it is unnecessary to give in detail, complicates the arrangement of the machine. Now, according to my invention, I apply to a platform endless chains or bands in such manner that the chains or bands may be caused to travel in a diagonal direction, or in a direction inclined to the finger-bar at a considerable angle, and by this arrangement the chains move the cut crop sidewise to clear the track, as when endless chains or bands which travel parallel to the finger-bar are employed, and at the same time the new arrangement admits of the main carrying and driving wheel being placed behind the finger-bar. I employ these diagonal carrying chains or bands in combination with a tilting platform somewhat similar to that heretofore employed for receiving the cut crop, which, when a sufficient quantity has accumulated, drops onto the land among the stubble. The tilting platform may conveniently (in my arrangement) be jointed to the finger-bar, and incline upward from it while it is receiving the cut crop, and then, when sufficient is accumulated, the platform is to be dropped or depressed. The teeth on the chains or bands will then project up through slits or openings in the platform and sweep the crop off and discharge the crop in bundles.

Figure 1 is a plan, Fig. 2 a side view, and Fig. 3 a section taken through the line 1 1, Fig. 1, of a machine thus arranged.

$a\ a$ is a frame, to which is attached the pole in such a manner that its inclination may be adjusted. The frame carries in bearings the axis $c$, on which is a pinion gearing with and driven by a ring of teeth on the main carrying and driving wheel $d$. The axis of this wheel is supported by bearings which are carried by the frame, provision being made, as is usual, for maintaining the frame $a$ at any desired angle, in order to be able to adjust the height of the cutter-bar $f$, which is rigidly fixed to the front of the frame $a$.

$c'$ is a beveled wheel on the axis $c$. It drives, as is usual, a beveled pinion on the axis $g$, at the lower end of which is a crank actuating the knife or cutter. $h$ is a seat over the carrying-wheel for the workman who superintends the action of the machine.

$k$ is a dividing-board and guard fixed at the outer end of the cutter-bar. It serves to divide and separate the strip of the crop to be immediately cut from the rest of the standing crop and to direct it well onto the knife at the outer end thereof, as is usual. To it is fixed the stud-axis of the wheel $l$ in such a manner that it may be adjusted up or down, according to the height at which it is desired to carry the cutter-bar. To the back of the cutter-bar is pivoted the tilting platform $m$. It consists of a bottom bar, on which are the pivots, and of boards fixed to it, as is shown, so as to form a platform with diagonal or inclined slits or openings.

$m'$ is a foot-board attached to the platform $m$. On this the workman places his foot, and by pushing it from him he raises the platform into the inclined position shown by red lines in Fig. 3. When in this position the platform $m$ receives the cut crop upon it, and when the workman draws back his foot the platform $m$ falls by its own weight and that of the crop until it is stopped by coming down upon the fixed platform $n$. The stationary platform $n$, with its bearers, is fixed to the frame $a$ on one side, and on the other to the under part of the dividing-board, which also forms for it a guard-rim to prevent any of the cut crop falling off on that side of the machine, and this guard-rim is continued round the back of the platform. Toward the front edge of the platform $n$ the chain-pulleys $o\ o$ are carried in suitable bearings. Around them endless chains $p\ p$ pass to other pulleys, $q\ q$, fixed on the inclined axis $q'$, the bearings of which are fixed to the platform. The axis $q'$ receives motion from a pinion, $g'$, on the axis $g$ through the beveled wheel $r$, with which the axis $q'$ is connected by the intermediate axis, $r'$, and two universal joints. Thus the endless chains $p\ p$ are caused to travel continuously while the machine is at work, and they have spikes or teeth upon them, and these, when the tilting platform $m$ is dropped, as already explained, enter among the cut crop upon it, which is thus rapidly drawn off and discharged at the side of the machine.

In order to prevent the cut crop lapping around the chain-pulleys of the endless delivery-chains, I fix on each side of the pitch-teeth of the pulleys, and between them and the flanges, stationary guards or rings, and each ring has a prong or tail by which it is fixed concentrically with the pulley. The flanges revolve with the pitch-teeth of the pulleys and serve to clear the crop out of the points or holding-teeth on the chains.

In some reaping-machines the chains $p$ may not be driven, as shown in the drawings, on the delivery side, although this arrangement is preferred, but on the side of the machine opposite thereto, in which cases the pulleys $o\ o$ will be arranged to be driven, and the pulleys $q$ may then be conveniently mounted separately on stud-axes carried by brackets so connected to the platform that the position of the bracket may be adjusted to tighten up the chain.

I would remark that, although I prefer to use endless chains with teeth or rakes for delivering the crop, as above described, other forms of endless bands or an endless apron arranged to move diagonally may be substituted therefor.

Having thus described the nature of my invention and the manner of performing the same, I would have it understood that what I claim is—

The combination of diagonal chains or bands for removing the cut grain with a movable platform provided with slots or openings, as described.

RICHARD HORNSBY.

Witnesses:
 THOS. BROWN,
 JOHN DEAN,
 Both of No. 17 Gracechurch Street, London.